(12) United States Patent
Kamps et al.

(10) Patent No.: US 11,447,611 B2
(45) Date of Patent: Sep. 20, 2022

(54) POLYCARBONATES WITH IMPROVED CARBON FIBER-MATRIX INTERPHASE

(71) Applicant: SABIC GLOBAL TECHNOLOGIES B.V., Bergen op Zoom (NL)

(72) Inventors: Jan Henk Kamps, Bergen op Zoom (NL); Nikhil Verghese, Bergen op Zoom (NL); Niles Rosenquist, Bergen op Zoom (NL); Ruud Van Der Heijden, Bergen op Zoom (NL); Paul Sybert, Bergen op Zoom (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 608 days.

(21) Appl. No.: 16/477,937

(22) PCT Filed: Jan. 25, 2018

(86) PCT No.: PCT/EP2018/051897
§ 371 (c)(1),
(2) Date: Jul. 15, 2019

(87) PCT Pub. No.: WO2018/138229
PCT Pub. Date: Aug. 2, 2018

(65) Prior Publication Data
US 2019/0359782 A1 Nov. 28, 2019

Related U.S. Application Data

(60) Provisional application No. 62/450,208, filed on Jan. 25, 2017.

(51) Int. Cl.
| | |
|---|---|
| *C08J 5/06* | (2006.01) |
| *B29C 43/00* | (2006.01) |
| *C08G 64/06* | (2006.01) |
| *C08G 64/42* | (2006.01) |
| *C08J 5/04* | (2006.01) |
| *B29K 69/00* | (2006.01) |
| *B29K 307/04* | (2006.01) |

(52) U.S. Cl.
CPC .............. *C08J 5/06* (2013.01); *B29C 43/003* (2013.01); *C08G 64/06* (2013.01); *C08G 64/42* (2013.01); *C08J 5/042* (2013.01); *B29K 2069/00* (2013.01); *B29K 2307/04* (2013.01); *C08J 2369/00* (2013.01)

(58) Field of Classification Search
CPC .......... C08J 5/06; C08J 5/042; C08J 2369/00; B29C 43/003; B29K 2069/00; B29K 2307/04; C08G 64/06; C08G 64/42; C08K 9/04; C08K 7/06
USPC ......................................................... 523/205
See application file for complete search history.

(56) References Cited

U.S. PATENT DOCUMENTS

| | | | |
|---|---|---|---|
| 4,416,924 A | 11/1983 | Peterson et al. | |
| 4,594,404 A * | 6/1986 | Kawakami | C08G 64/081 524/451 |
| 2014/0342144 A1* | 11/2014 | Nakayama | D06M 15/55 428/220 |

FOREIGN PATENT DOCUMENTS

JP    2003147069 A    5/2003

OTHER PUBLICATIONS

Huttinger K.J. et al., "Evidence for Chemical Bond Formation between Surface Treated Carbon Fibers and High Temperature Thermoplastics," Journal of Applied Polymer Science, vol. 51, 1994; pp. 737-742.
International Search Report forthe corresponding PCT/EP2018/051897; International Filing Date: Jan. 25, 2018; dated Apr. 30, 2018; 3 pages.
Raghavendran V.K. et al., "Fiber-Matrix Interfacial Adhesion Improvement In Carbon Fiber-Bisphenol-A Polycarbonate Composites By Polymer Grafting," The Journal of Adhesion, vol. 78, 2002; pp. 895-922.
Raghavendran V.K. et al., "Influence of matrix molecular weight and processing conditions on the interfacial adhesion in bisphenol-A polycarbonate/carbon fiber composites," Journal of Adhesion Sci. Technol., vol. 11, No. 12, 1997; pp. 1501-1512.
Written Opinion forthe corresponding PCT/EP2018/051897; International Filing Date: Jan. 25, 2018; 9 pages.

* cited by examiner

*Primary Examiner* — Hannah J Pak
(74) *Attorney, Agent, or Firm* — Cantor Colburn LLP (57) ABSTRACT

Various embodiments disclosed relate to a composition. The present invention includes a polycarbonate component and a carbon fiber component including an activated surface. An interface can be formed between the polycarbonate component and the carbon fiber component.

13 Claims, 2 Drawing Sheets

POLYCARBONATES WITH IMPROVED CARBON FIBER-MATRIX INTERPHASE

This application is a 371 of International Application No. PCT/EP2018/051897, filed Jan. 25, 2018, which claims the benefit of priority to U.S. Provisional Patent Application Ser. No. 62/450,208 entitled "Polycarbonates with Improved Carbon Fiber-Matrix Interphase," filed Jan. 25, 2017, the disclosures of both of which are incorporated herein in its their entirety by reference.

BACKGROUND

Composite materials formed from a polymer and a reinforcing fiber strike a desirable balance between strength and light weight, making them good performers in many applications. The strength of the composite material is a function of many different factors. For example, the strength of the material can depend on the materials that are used to form the composite or the connections between those materials. In order to provide composite materials that are useful for a broader range of applications it is desirable to create composites with increased strength.

SUMMARY

Composite materials formed from a polymer and a reinforcing fiber are desirable in that external stresses applied to the composite materials are shared with the fibers. The strength of the composite material is sometimes limited by the extent of the strength of the interface between the polymer and the fiber. For example, if the interface is weak, meaning that there is a poor coupling or connection between the polymer and the reinforcing fiber, then the overall strength of the composite material can change undesirably.

Modification of the fibers can enhance the strength of the interface between the polymer and the fiber. For example, by modifying the surface of the fiber or modification of the polymer (e.g., with a functional group that can react with a functional group of the polymer) the interface, and composite material as a whole, can be strengthened.

In an embodiment of the present invention, a polycarbonate component and a carbon fiber component includes an activated surface. An interface can be formed between the polycarbonate component and the carbon fiber component.

In another embodiment of the present invention, a composite material can be formed from a composition including a polycarbonate component and a carbon fiber component that includes an activated surface. An interface of the composite material includes a covalent bond formed between the polycarbonate component and the activated surface of the carbon fiber component.

In a further embodiment of the present invention a method of forming a composite material includes contacting a composition including a polycarbonate component and a carbon fiber component including an activated surface, with a mold. The method further includes heating the mold and applying pressure to the mold.

BRIEF DESCRIPTION OF THE FIGURES

The drawings illustrate generally, by way of example, but not by way of limitation, various embodiments discussed in the present document.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Composite materials formed from a polymer and a reinforcing fiber are desirable in that external stresses applied to the composite materials are shared with the fibers. The strength of the composite material is sometimes limited by the extent of the strength of the interface between the polymer and the fiber. For example, if the interface is weak, meaning that there is a poor coupling or connection between the polymer and the reinforcing fiber, then the overall strength of the composite material can change undesirably.

Modification of the fibers can enhance the strength of the interface between the polymer and the fiber. For example, by modifying the surface of the fiber or modification of the polymer (e.g., with a functional group that can react with a functional group of the polymer) the interface, and composite material as a whole, can be strengthened.

Various embodiments are directed to a composition comprising a polycarbonate component and a carbon fiber component. The composition can take on many forms, including a composite material or cured composite material. The carbon fiber component can comprise an activated surface. The activated surface of the carbon fiber component can comprise, among other things, nucleophilic groups that can react with the polycarbonate component. In a composite, an interface can be formed between the polycarbonate component and the carbon fiber component. The interface can be formed through a connection between the polycarbonate component and the carbon fiber. The connection can be accomplished through a chemical bond (e.g., covalent, ionic, or hydrogen bond), a physical connection (e.g., van der Waals forces or a mechanical connection) and combinations thereof.

The composition of the various embodiments can have any suitable amount of the carbon fiber component and of the polycarbonate component. The amounts of each component can vary depending on the specific application or desired properties of the composition. For example the carbon fiber component can range from about 1 wt % to about 70 wt % of the composition, or about 15 wt % to about 60 wt % of the composition, or about 30 wt % to about 50 wt % of the composition. The polycarbonate component can range from about 1 wt % to about 70 wt % of the composition, or about 15 wt % to about 60 wt % of the composition, or about 30 wt % to about 50 wt % of the composition.

In some embodiments, the carbon fiber component and the polycarbonate component are in direct contact at the interface. In some examples the interface can be formed by covalent bonds that are formed between the polycarbonate component and the activated surface of the carbon fiber component. More specifically, the covalent bond can be formed between the activated surface of the carbon fiber component and an electrophilic side chain of the polycarbonate component. Examples of suitable electrophilic side chains of the polycarbonate component are provided herein. The degree to which the electrophilic side chains of the polycarbonate component and the activated surface of the carbon fiber component are bonded to each other can range from about 1% to about 100% or about 50% to about 100% or about 75% to about 100 the electrophilic side chain can be covalently bonded to the activated surface of the carbon fiber component.

A higher percentage of the electrophilic side chains covalently bonded to the activated surface of the carbon fiber component can have the effect of strengthening the interface. However, having a lower percentage of electrophilic side chains covalently bonded to the activated surface of the carbon fiber component can confer certain effects as well. For example, the unbonded electrophilic groups are available to participate in both inter- and intra-molecular cross-linking with other electrophilic groups of the polycarbonate component. This can strengthen the polycarbonate component as a whole. The ability to control how much of the electrophilic side groups are bonded to the activated surface of the polycarbonate component versus how many are used in crosslinking can result in control in the properties of the composite material.

The interface between the polycarbonate component and the carbon fiber can also be formed through various non-covalent physical connections as opposed to, or in combination with, the covalent bonding described above. For example, the polycarbonate component and the carbon fiber can be joined though an ionic bond. Additionally, hydrogen bonds can be formed between the polycarbonate component and the carbon fiber component. For example, the hydrogen bond can be formed between electrophilic side chains of the polycarbonate component and the activated surface of the carbon fiber component.

In some examples, physical connections can connect the carbon fiber component and polycarbonate component. For example, van der Waals forces between electrophilic side chains of the polycarbonate component and the activated surface of the carbon fiber component can exist, which form the interface between them. In some examples, the interface can be formed from a mechanical connection between the polycarbonate component and the carbon fiber component. For example, the polycarbonate component can be wrapped around the carbon fiber component. The polycarbonate component can be fully wrapped around the carbon fiber or partially wrapped around the carbon fiber. The strength of the connection between the polycarbonate component and the carbon fiber can increase when the polycarbonate is wrapped around the carbon fiber. If the polycarbonate component is not completely wrapped around the carbon fiber, there may be more electrophilic side groups on the polycarbonate component that are available for crosslinking.

The mechanical connection between the polycarbonate component and the carbon fiber component can be enhanced by modifying the surface of the carbon fiber component. For example, the surface roughness of the carbon fiber component can be increased. As the surface roughness increases, the connection between the polycarbonate component and the carbon fiber component can increase.

The connection at the interface of the polycarbonate component and the carbon fiber can also be a combination of any of the above described connections. That is, the interface can comprise covalent bonds, ionic bonds, van der Waals forces, hydrogen bonds, a mechanical connection, or any combination thereof.

In some examples the composition can comprise a second polycarbonate component. Similar to the first polycarbonate component, the second polycarbonate component can include a variable amount of a repeating units comprising an electrophilic side chain. In some examples the second polycarbonate component can be free of the electrophilic side chain. Nevertheless, the second polycarbonate component can still join to the carbon fiber in a manner similar to that of the previously described polycarbonate component. Additionally, an interface can be formed between the second polycarbonate component and the first polycarbonate component. In this case, the carbon fiber can be pre-coated with the first polycarbonate component. The second polycarbonate component can then be attached to form an interface between the polycarbonate component and the second polycarbonate component. The interface can comprise covalent bonds, ionic bonds, van der Waals forces, hydrogen bonds, a mechanical connection or any combination thereof.

The strength of the composite material can be assessed in many different ways. As described in the examples herein the integrity of the interface between the polycarbonate component and the carbon fiber can be one way to assess the strength. The integrity can be assessed through SEM. For example, the spacing between the fiber and polycarbonate component can relate to the integrity of the interface. That is, the absence of a gap between the polycarbonate component and the carbon fiber suggests a stronger connection and overall stronger material. Additionally, the presence of fibrils between the matrix and the carbon fiber can be a sign of good adhesion and integrity. The length of the carbon fibers can be determined. Short fibers lengths sticking from the fracture surface are generally an indication of good adhesion. Additionally, residual matrix material on the carbon fibers are also a sign of improved adhesion. In some examples the material has a tensile strength ranging that is larger than that of the individual components. For example, the tensile strength of the material can range from about 100% of the tensile strength of the polycarbonate component to about 100% or above of the tensile strength of the carbon fiber component.

Carbon fibers or carbon fibres (alternatively CF, graphite fiber or graphite fibre) can be fibers of any suitable length, diameter, and aspect ratio. In some examples, the fibers can be fibers of about 5 to about 10 micrometers in diameter and composed mostly of carbon atoms. The atomic structure of carbon fiber is typically similar to that of graphite, which includes sheets of carbon atoms arranged in a regular hexagonal pattern (graphene sheets), the difference between the two being the way these sheets interlock.

Depending upon the precursor to make the fiber, carbon fiber can be turbostatic or graphitic, or have a hybrid structure with both graphitic and turbostratic parts present. In turbostratic carbon fiber the sheets of carbon atoms are haphazardly folded, or "crumpled" together. For example, carbon fibers derived from polyacrylonitrile (PAN) are turbostratic, whereas carbon fibers derived from mesophase pitch are graphitic after heat treatment at temperatures exceeding 2200° C. Turbostratic carbon fibers tend to have high tensile strength, whereas heat-treated mesophase-pitch-derived carbon fibers have high Young's modulus (i.e., high stiffness or resistance to extension under load) and high thermal conductivity.

Regardless of the form of the carbon fiber (e.g., turbostratic vs. graphitic), the carbon fiber component of the various compositions described herein can be modified to comprise an activated surface. The groups of the activated surface can be activated, for example, through electrochemical treatment, plasma treatment, or ozone treatment. In some embodiments, the activated surface comprises a nucleophilic group, such that the surface of the carbon fiber component comprises at least one, but generally a plurality of nucleophilic groups that can interact with the polycarbonate component to form an interface. The nucleophilic group can be selected from the group of, a hydroxy group, a carboxyl group, an amino group, and a combination thereof. In various examples the activated surface comprises about 0.05 atomic concentration % to about 20 atomic concentration % nucleophilic groups, or about 0.05 atomic concentration % to about 8 atomic concentration % nucleophilic group. The atomic concentration % of the activated surface on the carbon fiber component can be determined using methods known in the art. For example, the atomic concentration % can be determined by X-ray photoelectron spectroscopy (XPS). A typical XPS spectrum is a plot of the number of electrons detected (Y-axis, ordinate) versus the binding energy of the electrons detected (X-axis, abscissa). Each element produces a characteristic set of XPS peaks at characteristic binding energy values that directly identify each element that exists in or on the surface of the material being analyzed. These characteristic spectral peaks correspond to the electron configuration of the electrons within the atoms, e.g., 1 s, 2s, 2p, 3s, etc. The number of detected electrons in each of the characteristic peaks is directly related to the amount of element within the XPS sampling volume. To generate atomic concentration % values, each raw XPS signal is corrected by dividing its signal intensity (number of electrons detected) by a relative sensitivity factor (RSF), and normalized over all of the elements detected. Since hydrogen is not detected, these atomic percentages exclude hydrogen.

The carbon fiber component of the composition can comprise one or more carbon fibers. That is the carbon fiber component can comprise multiple carbon fibers that include the same nucleophilic group(s) accounting for the same mol %. In some examples, the carbon fiber component can include a mixture of carbon fibers having different nucleophilic groups forming different activated surfaces. In some examples, the nucleophilic groups on different carbon fibers can be the same but the mol % of the nucleophilic groups can differ. Additionally, some carbon fibers can include nucleophilic groups, while others are free of nucleophilic groups but have other features to help form the interface (e.g., a roughed surface).

The polycarbonate component of the composition can be a polycarbonate copolymer. The polycarbonate copolymer comprises a repeating unit derived from a bisphenol derivative and a repeating unit comprising an electrophilic side chain. Each repeating unit can be independently in random, block, or alternating configuration. In some specific examples of the polycarbonate component, the repeating units are in random configuration.

In various embodiments, the polycarbonate copolymer comprises electrophilic side chains along the backbone of the copolymer. In some embodiments, the electrophilic side chains can react with the activated surface of the carbon fiber. The electrophilic side chain can include electrophilic moieties capable of reacting with, e.g., nucleophilic groups comprised on the activated surface of the carbon fiber component. Suitable electrophilic moieties present on the electrophilic side chains include, but are not limited to, carbonyl groups, cyano groups, isocyanate groups, haloalkyls, and alkenyls. Suitable carbonyl groups comprise an ester, a carboxylic acid, and combinations thereof.

The repeating unit comprising the electrophilic side chain has the structure in Formula I:

I $R^1$ is an aryl group that includes the electrophilic side chain. The aryl group can be a phenyl group that is meta, ortho, or para substituted in a backbone of the copolymer as shown below in Formula II:

II

Each group $R^2$ can be independently chosen from:

At least one $R^2$ can be an ester and $R^3$ can be $(C_1-C_{10})$ alkyl.

In some examples the repeating unit comprising the electrophilic side chain has the structure in Formula III:

III

In Formula III the phenyl group can be ortho-, meta-, or para-substituted and $R^3$ can be $(C_1-C_{20})$ alkyl or $(C_1-C_{20})$ cycloalkyl. In some examples $R^3$ can be selected from the group consisting of, methyl, ethyl, propyl, isopropyl, isobutyl, n-butyl, sec-butyl, tert-butyl and combinations thereof. In some examples, the repeating unit comprising the electrophilic side chain has the structure in Formula IV which shows a meta substitution:

IV

In some examples the repeating unit comprising the electrophilic side chain can be an end group in Formula V:

V

As shown Formula V. shows an example of the repeating unit comprising the electrophilic side chain in which the repeating unit terminates in a hydroxyl group.

The polycarbonate component can include a polymer or copolymer having repeating structural carbonate units of Formula VI

VI wherein at least 60 percent of the total number of $R^4$ groups are aromatic, or each $R^4$ contains at least one $C_{6-10}$ aryl group. Each $R^4$ group can be the same or different. For example, each $R^4$ can be derived from a dihydroxy compound such as an aromatic dihydroxy compound of Formula VII or a bisphenol of Formula VIII.

VII

VIII

In Formula VII, each Rh can be independently, a carbonyl group, a cyano group, an isocyanate groups, alkenyls a halogen group, for example bromine, a $C_{1-10}$ group such as a $C_{1-10}$ alkyl, a halogen-substituted $C_{1-10}$ alkyl, a $C_{6-10}$ aryl, or a halogen-substituted $C_{6-10}$ aryl, and n can be 0 to 4. Suitable carbonyl groups comprise an ester, a carboxylic acid, and combinations thereof In Formula VIII $R^a$ and $R^b$ are each independently a halogen, $C_{1-12}$ alkoxy, or $C_{1-12}$ alkyl, and p and q are each independently integers of 0 to 4, such that when p or q can be less than 4, the valence of each carbon of the ring is filled by hydrogen. In an embodiment, p and q can be each 0, or p and q is each 1, and $R^a$ and $R^b$ are each a $C_{1-3}$ alkyl group, such as methyl, disposed meta to the hydroxy group on each arylene group. $X^3$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ alkyl group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkenyl; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

In some examples, the polycarbonate contains carbonate units (1) and non-carbonate units, for example ester units, polysiloxane units such as polydimethylsiloxane units, or a combination comprising at least one of the foregoing. In some embodiments the ester units can be aromatic ester units (e.g., resorcinol terephthalate or isophthalate), or aromatic-aliphatic esters.

In some examples, the polycarbonate can be a linear homopolymer containing bisphenol A carbonate units (BPA-PC), commercially available under the trade name LEXAN from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN CFR from SABIC. A specific copolycarbonate includes bisphenol A and bulky bisphenol carbonate units, i.e., derived from bisphenols containing at least 12 carbon atoms, for example 12 to 60 carbon atoms or 20 to 40 carbon atoms. Examples of such copolycarbonates include copolycarbonates comprising bisphenol A carbonate units and 2-phenyl-3,3'-bis(4-hydroxyphenyl) phthalimidine carbonate units (a BPA-PPPBP copolymer, commercially available under the trade name XHT from SABIC), a copolymer comprising bisphenol A carbonate units and 1,1-bis(4-hydroxy-3-methylphenyl)cyclohexane carbonate units (a BPA-DMBPC copolymer commercially available under the trade name DMC from SABIC), and a copolymer comprising bisphenol A carbonate units and 1,1-bis(4-hydroxy-3-methylphenyl)-3,3,5-trimethylcyclohexane isophorone bisphenol carbonate units (available, for example, under the trade name APEC from Bayer).

Other specific polycarbonates that can be used include poly(aromatic ester-carbonate)s comprising bisphenol A carbonate units and isophthalate-terephthalate-bisphenol A ester units, also commonly referred to as poly(carbonate-ester)s (PCE) or poly(phthalate-carbonate)s (PPC), depending on the relative ratio of carbonate units and ester units. Another specific poly(ester-carbonate) comprises resorcinol isophthalate and terephthalate units and bisphenol A carbonate units, such as those commercially available under the trade name LEXAN SLX from SABIC.

In some examples, the polycarbonate can be a poly(carbonate-siloxane) copolymer comprising bisphenol A carbonate units and siloxane units, for example blocks containing 5 to 200 dimethylsiloxane units, such as those commercially available under the trade name EXL from SABIC. Other polycarbonates that can be used include poly(ester-siloxane-carbonate)s comprising bisphenol A carbonate units, isophthalate-terephthalate-bisphenol A ester units, and siloxane units, for example blocks containing 5 to 200 dimethylsiloxane units, such as those commercially available under the trade name FST from SABIC.

Poly(aliphatic ester-carbonate)s can be used, such as those comprising bisphenol A carbonate units and sebacic acid-bisphenol A ester units, such as those commercially available under the trade name LEXAN HFD from SABIC.

Combinations of polycarbonates with other polymers can be used, for example an combination of bisphenol A polycarbonate with an ester such as poly(butylene terephthalate) or poly(ethylene terephthalate), each of which can be semicrystalline or amorphous can be used. Such combinations are commercially available under the trade name XENOY and XYLEX from SABIC.

The bisphenol polycarbonate repeating units can be derived from many different bisphenols. Suitable bisphenols comprise those selected from the group of 1,1-bis(4-hydroxyphenyl)methane, 1,1-bis(4-hydroxyphenyl)ethane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)-n-butane, 2,2-bis(4-hydroxy-1-methylphenyl)propane, 4,4'-dihydroxybiphenyl, bis(4-hydroxyphenyl)methane, bis(4-hydroxyphenyl)diphenylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 1,1-dichloro-2,2-bis(4-hydroxyphenyl)ethylene, 1,1-dibromo-2,2-bis(4-hydroxyphenyl)ethylene, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2-phenyl-3,3-bis-(4-hydroxyphenyl) phthalimidine (PPP BP), 2,2-bis(4-hydroxy-3-bromophenyl)propane, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(5-phenoxy-4-hydroxyphenyl)ethylene, bis-(4-hydroxyphenyl)diphenylmethane), bis(4-hydroxydiphenyl)methane, 2,2-bis(4-hydroxy-3-isopropyl-phenyl)propane, 5,5'-(1-methylethyliden)-bis[1,1'-(bisphenyl)-2-ol]propane, 1,1-bis(4-hydroyphenyl)-3,3,5-trimethyl-cyclohexane, 1,1-bis(4-hydroxyphenyl)-cyclohexane, 2-phenyl-3,3'-bis(4-hydroxy phenyl) phthalimidine, and combinations thereof. In specific examples the bisphenol derived repeating unit can be bisphenol A (2,2-bis(4-hydroxyphenyl)propane). Any of these repeating units can be included in the polycarbonate component. Because there are many different types of polycarbonate units and electrophilic-side-group containing units that can be used, there can be great variety in the polycarbonate component that can be formed. One such example is shown below in which the polycarbonate repeating unit is a bisphenol A derived monomer and the electrophilic-side-group containing repeating unit is derived from ethyl 3,5 dihydroxybenzoate. Such a polycarbonate component is shown below in the structure in Formula IX and X:

The difference between Formula IX and Formula X is that Formula X shows a repeating unit formed from a monofunctional hydroxyl monomer including an electrophilic side-chain. The amount of each repeating unit in the polycarbonate can vary depending on the desired properties of the composition. For example, if more covalent bonding is desired at the interface, then the amount of the polycarbonate that can be made from the electrophilic-side-group-containing repeating unit can be increased. However, the bisphenol-derived-repeating unit typically can be at least 50 mol % of the polycarbonate component. For example, the bisphenol-derived-repeating unit can range from about 50 mol % to about 99 mol % of the polycarbonate copolymer or from about 70 mol % to about 99 mol % of the polycarbonate copolymer.

Conversely, the electrophilic-side-group-containing repeating unit can be typically less than 50 mol % of the polycarbonate copolymer. For example, the electrophilic side group containing repeating unit can range from about 0.2 mol % to about 50 mol % of the polycarbonate copolymer, or about 0.2 mol % to about 20 mol % of the polycarbonate copolymer, or about 0.2 mol % to about 9 mol % of the polycarbonate copolymer. In some examples the electrophilic side group repeating units may only be present as end groups on the polycarbonate copolymer.

As described above the presence of the electrophilic-side-chain-containing repeating unit allows for a reaction between the electrophilic side chains and the carbonate functionality in the polycarbonate component. A reaction between the electrophilic side chains and the carbonate functionality results in a bond therebetween. Thus, there can be a crosslink between the polymer chains. The exact degree to which the electrophilic side chains are crosslinked can vary. For example, about 0 mol % to about 100 mol % of the repeating unit comprising the electrophilic side chain can crosslinked. In some examples about 5% to about 95%, or about 30% to about 95%, or about 60% to about 95%, or about 70% to about 95%. The strength of the polycarbonate component increases as the mol % of crosslinked electrophilic-side-group-containing repeating units increases. However, as the mol % increases the ability of the polycarbonate component to covalently bond with the carbon fiber can decrease. In examples where there can be a relatively high mol % of the repeating unit comprising the cross-linked electrophilic side chain, the interface between the polycarbonate component and the carbon fiber may be formed from in varying degrees by van der Waals forces, hydrogen bonding or by a mechanical connection. Electrophilic side chains that are not crosslinked are free to react with the nucleophilic groups of the carbon fiber component.

The crosslink between the electrophilic-side-chain-containing repeating units can be an intermolecular crosslink, intramolecular crosslink, or a combination thereof. The presence of the crosslink can increase the flame retardant characteristics of the material. That is, the flame retardant characteristics of the material increases as the degree of crosslinking increases. The flame retardant characteristics of the material can also be increased by including flame retardant additives in the material. In the composite material the flame retardant additives can range from about 0.4 wt % to about 20 wt % or from about 4 wt % to about 15 wt % of the material, relative to the total weight of the polycarbonate component. Some illustrative examples of flame retardants include, for example, organophosphorous compounds such as organic phosphates (including trialkyl phosphates such as triethyl phosphate, tris(2-chloropropyl)phosphate, and triaryl phosphates such as triphenyl phosphate and diphenyl cresyl phosphate, resorcinol bis-diphenylphosphate, resorcinol diphosphate, and aryl phosphate), phosphites (including trialkyl phosphites, triaryl phosphites, and mixed alkyl-aryl phosphites), phosphonates (including diethyl ethyl phosphonate, dimethyl methyl phosphonate), polyphosphates (including melamine polyphosphate, ammonium polyphosphates), polyphosphites, polyphosphonates, phosphinates (including aluminum tris(diethyl phosphinate); halogenated fire retardants such as chlorendic acid derivatives and chlorinated paraffins; organobromines, such as decabromodiphenyl ether (decaBDE), decabromodiphenyl ethane, polymeric brominated compounds such as brominated polystyrenes, brominated carbonate oligomers (BCOs), brominated epoxy oligomers (BEOs), tetrabromophthalic anyhydride, tetrabromobisphenol A (TBBPA) and hexabromocyclododecane (HBCD); metal hydroxides such as magnesium hydroxide, aluminum hydroxide, cobalt hydroxide, and hydrates of the foregoing metal hydroxide; and combinations thereof. The flame retardant can be a reactive type flame-retardant (including polyols which contain phosphorus groups, 10-(2,5-dihydroxyphenyl)-10H-9-oxa-10-phospha-phenanthrene-10-oxide, phosphorus-containing lactone-modified polyesters, ethylene glycol bis (diphenyl phosphate), neopentylglycol bis(diphenyl phosphate), amine- and hydroxyl-functionalized siloxane oligomers). These flame retardants can be used alone or in conjunction with other flame retardants.

The composite material described above can be formed many different ways. For example, the composite material can be formed through a compression molding or injection molding process. An example of a suitable method of forming the composite material using a compression molding process can comprise placing the composition of the polycarbonate component and carbon fiber in a mold. Once the composition is in the mold, the mold can be heated and pressure can be applied to the mold to form the composite.

In some examples, the mold can be heated before either the polycarbonate component or carbon fiber are added to the mold. In additional examples, the polycarbonate component and carbon fiber are added at different times. For example, the polycarbonate component can be added to the mold first and melted. Once the polycarbonate is melted, then the carbon fiber can be added to the mold.

The composition can be cured during the heating process. The temperature at which the mold is heated can vary, but can be typically above a $T_g$ of the polycarbonate component. A suitable temperature range for heating the mold can be from about 100° C. to about 350° C., or about 200° C. to about 350° C.

The mold can be heated from about 1 minute to about 60 minutes, or from about 1 minute to about 30 minutes, or from about 5 minutes to about 30 minutes. While the mold is heated the mold can also be subjected to an applied pressure. The pressure can range from about 0.5 ton to about 4 tons, or from about 1 ton to about 2 tons.

EXAMPLES

Various embodiments of the present invention can be better understood by reference to the following Examples which are offered by way of illustration. The present invention is not limited to the Examples given herein. In the Examples the electrophilic-side-group (ESG) containing co-polycarbonate can be formed from repeating units derived from bisphenol A and ethyl 3,5 dihydroxybenzoate as described above with respect to Formula IX. In the Examples PC105 is a linear polycarbonate homopolymer that does not comprise electrophilic side groups.

In the Examples SEM refers to side scanning electron microscopy, GPC refers to gel permeation chromatography, ATR-FTIR refers to attenuated total reflectance Fourier transform infrared spectroscopy.

Comparative Example 1

PC105, Heated at 200° C. for 1 Minute

With approximately 300 mg PC105 granulate (dried for 1 hour at 100° C. in a vacuum oven; $M_w$=59, 400 g/mole; PD=2.5) and a length of unsized carbon fiber tow (24K) a 250 µm-thick film with a diameter of 30 mm was prepared by compression molding using the following steps: (1) heat the mold for 1 minute at 200° C. to melt the polymer and (2) heat for an additional 1 minute at 200° C. with 2 tons pressure to prepare a film. Following steps (1) and (2) GPC analysis (PS data) showed the PC matrix having a $M_w$=59, 200 and PD=2.5. This indicates that the combination of temperature and time have a limited effect on the molecular weight distribution of PC105.

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed no residual PC on the fiber surface.

Figure 1:
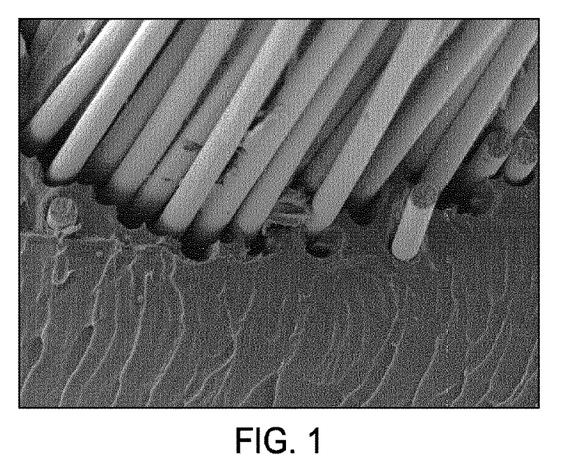
FIG. 1 shows a scanning electron micrograph (SEM) image of composite material in some embodiments.
Figure 2:
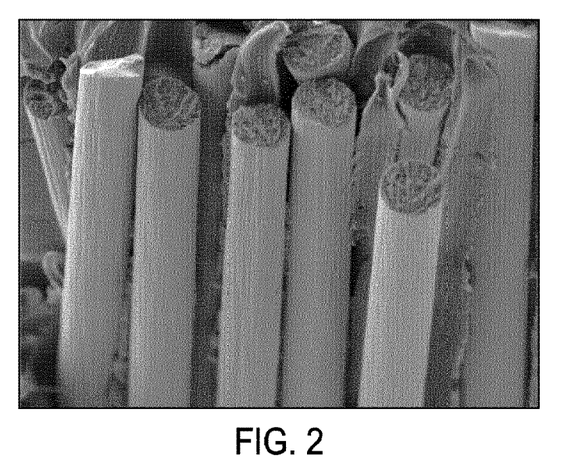
FIG. 2 is an enlarged image of the composite material of FIG. 1.

FIG. 1 shows an SEM image of the resulting composite material. FIG. 2 is an enlarged image of the composite material of FIG. 1. SEM analysis of the cross section, using cryo-fracture and sputter coating (5 nm PtPD) for sample preparation, showed long fibers and large gaps between the matrix and fibers, which both are typical for poor adhesion between fiber and matrix. From the analysis of the SEM and ATR-FTIR it can be concluded that there is poor coupling between PC105 matrix and unsized carbon fiber.

Comparative Example 2

PC105, Heated at 300° C. for 1 Minute

With approximately 300 mg PC105 granulate (dried for 1 hour at 100° C. in a vacuum oven; $M_w$=59, 400 g/mole; PD=2.5) and a length of unsized carbon fiber tow (24K), a 250 μm-thick film with a diameter of 30 mm was prepared by compression molding using the following steps: (1) heat the mold for 1 minute at 300° C. to melt the polymer and (2) heat for an additional 1 minute at 300° C. with 2 tons pressure to prepare a film. SEM analysis of the cross section, using cryo-fracture and sputter coating (5 nm PtPD) for sample preparation, showed long fibers and large gaps between the matrix and fibers, which both are typical for poor adhesion between fiber and matrix. Following steps (1) and (2) GPC analysis (PS data) showed the PC matrix having a $M_w$=58,800 and PD=2.5. This indicates that the combination of temperature and time have a limited effect on the molecular weight distribution of PC105.

Although a higher temperature was used for compression molding compared to comparative example 1, the reduced viscosity of the resin did not improve fiber wetting and interfacial adhesion.

Comparative Example 3

PC105, Heated at 300° C. for 10 Minutes

With approximately 300 mg PC105 granulate (dried for 1 hour at 100° C. in a vacuum oven; $M_w$=59, 400 g/mole; PD=2.5) and a length of unsized carbon fiber tow (24K), a 250 μm-thick film with a diameter of 30 mm was prepared by compression molding using the following steps: (1) heat the mold for 10 minutes at 300° C. to melt the polymer and (2) heat for an additional 1 minute at 300° C. with 2 tons pressure to prepare a film. Following steps (1) and (2) GPC analysis (PS data) showed the PC matrix having a $M_w$=56, 800 and PD=2.5. This indicates that the combination of temperature and time have a limited effect on the molecular weight distribution of PC105.

SEM analysis of the cross section, using cryo-fracture and sputter coating (5 nm PtPD) for sample preparation, showed both long and short fibers. Compared to comparative Examples 1 and 2 the gap between fiber and matrix also seems to be smaller and, according to residual PC on the fiber surface and fibrils between fiber and matrix, the PC is better adhered to the fiber surface. Increasing the melting time from 1 (comparative example 2) to 10 minutes at 300° C. resulted in a slightly improved fiber wetting and interfacial adhesion.

Comparative Example 4

PC105, Heated at 325° C. for 30 Minutes

With approximately 300 mg PC105 granulate (dried for 1 hour at 100° C. in a vacuum oven; $M_w$=59, 400 g/mole; PD=2.5) and a length of unsized carbon fiber tow (24K), a 250 μm-thick film with a diameter of 30 mm was prepared by compression molding using the following steps: (1) heat the mold for 30 minutes at 325° C. to melt the polymer and (2) heat for an additional 1 minute at 325° C. with 2 tons pressure to prepare a film. Following steps (1) and (2) GPC analysis (PS data) showed the PC matrix having a $M_w$=55, 600 and PD=2.5. This indicates that the combination of temperature and time have a limited effect on the molecular weight distribution of PC105.

ATR-FTIR imaging of the fiber surface (plotting the IR-image of the C=O peak area between 1800 and 1710 $cm^{-1}$) after treating the compression molded film with 20 ml dichloromethane (DCM) overnight, followed by washing (2×20 ml) and vacuum drying (80° C. overnight) of the remaining fibers, showed no residual PC on the fiber surface.

It can be concluded that no, or only weak non-covalent connections exist between PC105 and the fiber surface of unsized carbon fiber, even when a combination of high temperature (325° C.) and curing time (30 minutes) is used.

Comparative Example 5

Thermal Desorption GC-TOFMS of PC105

Volatiles were analyzed with GC-TOFMS after thermal desorption of approximately 8 mg PC105 granulate (dried for 2 hours at 120° C. in a vacuum oven) at 300° C. for both 10 minutes and 30 minutes. The total ion chromatogram (TIC) was analyzed and relevant peaks were quantified, shown in Table 1.

TABLE 1

| | GC-TOFMS Results | | |
|---|---|---|---|
| Sample | Time (min) | $CO_2$ (area/mg) | Ethene (area/mg) |
| PC105 | 10 | 8758 | — |
| PC105 | 30 | 9154 | — |
| 4.9% ESG PC | 10 | 41532 | 5379 |
| 4.9% ESG PC | 30 | 66785 | 11219 |

Comparative Example 6

Single Fiber Pull Out Lexan HF-1110: Heated at 300° C. for 30 Seconds

Single fiber pull out testing was performed at Leibniz-Institut für Polymerforschung Dresden e. V. (IPF) using institute-built equipment for both fiber embedment and pull-out testing. Single fiber model composites were produced by embedding 150 μm of a single unsized carbon fiber into Lexan HF-1110 (dried for 2 hours at 120° C.) at 300° C. under argon atmosphere using the following sequence. The polymer was heated to 300° C. at 15° C./min and held at 300° C. for 30 seconds. 150 μm of a fiber was embedded and the matrix was held at 300° C. for 30 seconds. The matrix was then cooled to room temperature in 30 minutes. Table 2 shows the work needed to debond and pull out (Wtotal) a single fiber from the matrix, based on 15-20 measurements.

TABLE 2

| | Work to debond and pull fiber out from the matrix | | |
|---|---|---|---|
| Matrix | Curing time (min) | $W_{total}$ (mN mm) | Sd |
| Lexan HF-1110 | 0.5 | 2.3 | 1.4 |
| 4.9% ESG PC | 0.5 | 4.6 | 1.6 |
| 4.9% ESG PC | 10 | 10.2 | 4.8 |

Example 1

8.6 mol % Ester Side Group (ESG) Co-Polycarbonate: Cured at 200° C. for 1 Minute With approximately 300 mg 8.6 mol % ESG co-polycarbonate powder (dried for 1 hour at 100° C. in a vacuum oven) and a length of unsized carbon fiber tow (24K), a 250 µm-thick film with a diameter of 30 mm was prepared by compression molding using the following steps: (1) heat the mold for 1 minute at 200° C. to melt the polymer and (2) heat for an additional 1 minute at 200° C. with 2 tons pressure to prepare a film.

From GPC analysis (PS data) of the matrix it can be concluded that limited amount of cross-linking/chain extension occurred since $M_w$ (52,436 g/mol) and PD (2.76) are similar to the original powder ($M_w$=49,585 g/mol; PD=2.80).

SEM analysis of the cross section, using cryo-fracture and sputter coating (5 nm PtPD) for sample preparation, showed long fibers and large gaps between the matrix and fibers, which both are typical for poor adhesion between fiber and matrix.

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed no residual PC on the fiber surface.

It can be concluded that there is poor coupling between unsized carbon fiber and non-cured 8.6 mol % ESG co-polycarbonate, similar to comparative Example 1 where PC105 was used as the matrix.

Example 2

8.6 Mol % ESG Co-Polycarbonate: Cured at 200° C. for 10 Minutes

With approximately 300 mg 8.6 mol % ESG co-polycarbonate powder (dried for 1 hour at 100° C. in a vacuum oven) and a length of unsized carbon fiber tow (24K), a 250 µm-thick film with a diameter of 30 mm was prepared by compression molding using the following steps: (1) heat the mold for 10 minutes at 200° C. to melt the polymer and (2) heat for an additional 1 minute at 200° C. with 2 tons pressure to prepare a film.

From GPC analysis (PS data) of the matrix it can be concluded that limited amount of cross-linking/chain extension occurred since $M_w$ (52,115 g/mol) and PD (2.75) are similar to the original powder ($M_w$=49,585 g/mol; PD=2.80).

SEM analysis of the cross section, using cryo-fracture and sputter coating (5 nm PtPD) for sample preparation, showed long fibers and large gaps between the matrix and fibers, which both are typical for poor adhesion between fiber and matrix.

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed no residual PC on the fiber surface.

Increasing the curing time from 1 minute (Example 1) to 10 minutes at 200° C. did not improve fiber wetting and interfacial adhesion.

Example 3

8.6 Mol % ESG Co-Polycarbonate: Cured at 250° C. for 10 Minutes

With approximately 300 mg 8.6 mol % ESG co-polycarbonate powder (dried for 1 hour at 100° C. in a vacuum oven) and a length of unsized carbon fiber tow (24K), a 250 µm-thick film with a diameter of 30 mm was prepared by compression molding using the following steps: (1) heat the mold for 10 minutes at 250° C. to melt the polymer and (2) heat for an additional 1 minute at 250° C. with 2 tons pressure to prepare a film.

From GPC analysis (PS data) of the matrix it can be concluded that limited amount of cross-linking/chain extension occurred since $M_w$ (51,951 g/mol) and PD (2.73) are similar to the original powder ($M_w$=49,585 g/mol; PD=2.80).

Figure 3:
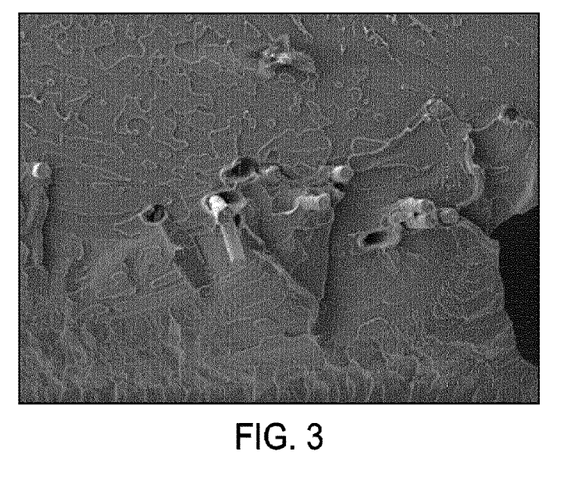
FIG. 3 shows an SEM image of composite material in some embodiments.
Figure 4:
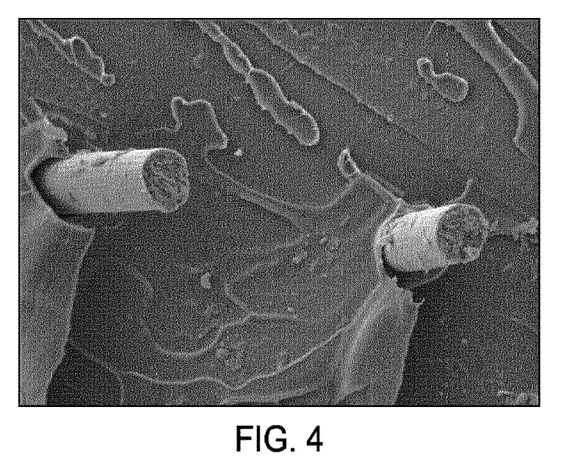
FIG. 4 is an enlarged image of the composite material of FIG. 3

SEM analysis of the cross section, using cryo-fracture and sputter coating (5 nm PtPD) for sample preparation, showed long and short fibers. Additionally, residual PC on the fiber surface is a sign of improved adhesion compared to Example 2. FIG. 3 shows an SEM image of the resulting composite material. FIG. 4 is an enlarged image of the composite material of FIG. 3.

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed residual PC on the fiber surface.

When cured for 10 minutes at 250° C. instead of 200° C. (Example 2) an improved coupling is observed between matrix and fiber surface, which makes it more difficult to completely remove PC from the fiber surface.

Example 4

8.6 Mol % ESG Co-Polycarbonate: Cured at 300° C. for 10 Minutes

With approximately 300 mg 8.6 mol % ESG co-polycarbonate powder (dried for 1 hour at 100° C. in a vacuum oven) and a length of unsized carbon fiber tow (24K), a 250 µm-thick film with a diameter of 30 mm was prepared by compression molding using the following steps: (1) heat the mold for 10 minutes at 300° C. to melt the polymer and (2) heat for an additional 1 minute at 300° C. with 2 tons pressure to prepare a film.

From GPC analysis (PS data) of the matrix it can be concluded that a limited amount of cross-linking/chain extension occurred since $M_w$ (53,552 g/mol) and PD (2.61) are similar to the original powder ($M_w$=49,585 g/mol; PD=2.80).

SEM analysis of the cross section, using cryo-fracture and sputter coating (5 nm PtPD) for sample preparation, showed short fibers and a matrix that is tight around the fiber, which are both a sign of good adhesion between fiber and matrix.

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed residual PC on the fiber surface.

Increasing the curing temperature from 250° C. (Example 3) to 300° C. further improved coupling between matrix and fiber surface, making it difficult to completely remove the PC matrix from the fibers. This improved coupling can be assigned to the ester functionality, since only minor improvement of the interfacial adhesion and fiber wetting was observed for PC105 under the same conditions (comparative Example 3).

Example 5

8.6 Mol % ESG Co-Polycarbonate: Cured at 325° C. for 10 Minutes

With approximately 300 mg 8.6 mol % ESG co-polycarbonate powder (dried for 1 hour at 100° C. in a vacuum oven) and a length of unsized carbon fiber tow (24K), a 250 μm-thick film with a diameter of 30 mm was prepared by compression molding using the following steps: (1) heat the mold for 10 minutes at 325° C. to melt the polymer and (2) heat for an additional 1 minute at 325° C. with 2 tons pressure to prepare a film. From GPC analysis (PS data) of the matrix it can be concluded that a significant amount of cross-linking/chain extension occurred since $M_w$ increased to 56,813 g/mol (original powder $M_w$=49,585 g/mol), which also resulted in a higher PD of 3.00 (original powder PD=2.80). ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed residual PC on the fiber surface. Apparently, improved coupling is generated between matrix and fiber surface, which makes it hard to completely remove PC from the fiber surface by DCM washing.

ATR-FTIR results are similar to Example 3 and 4 where the ESG co-polycarbonate was cured for 10 minutes at 250° C. and 300° C., respectively. A potential drawback of using 325° C. is that more ethene and $CO_2$ may be released due to more efficient cross-linking/chain extension at this temperature, which results in an increasing amount of bubbles.

Example 6

8.6 Mol % ESG Co-Polycarbonate: Cured at 325° C. for 1 Minute

With approximately 300 mg 8.6 mol % ESG co-polycarbonate powder (dried for 1 hour at 100° C. in a vacuum oven) and a length of unsized carbon fiber tow (24K), a 250 μm-thick film with a diameter of 30 mm was prepared by compression molding using the following steps: (1) heat the mold for 1 minute at 325° C. to melt the polymer and (2) heat for an additional 1 minute at 325° C. with 2 tons pressure to prepare a film.

From GPC analysis (PS data) of the matrix it can be concluded that limited amount of cross-linking/chain extension occurred since $M_w$ (52,513 g/mol) and PD (2.75) are similar to the original powder ($M_w$=49,585 g/mol; PD=2.80).

SEM analysis of the cross section, using cryo-fracture and sputter coating (5 nm PtPD) for sample preparation, showed long and short fibers with only small gaps between fiber and matrix. Additionally, residual PC on the fiber surface and the presence of fibrils between fibers and matrix are both signs of improved adhesion.

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed no residual PC on the fiber surface.

Compared to Example 1 (1 minute at 200° C.) this sample showed a significantly better fiber wetting and interfacial adhesion but not as good as for Example 4 (10 minutes at 300° C.), where the PC was more tight around the fibers and residual PC was detected with ATR-FTIR imaging of the fiber surface after DCM washing. Apparently, fiber wetting and interfacial adhesion is improved at high temperatures, but more time is needed to achieve the results of Example 4 (10 minutes at 300° C.). Compared to Example 5 (10 minutes at 325° C.) the reduced curing time has the advantage of less bubbles (ethene and $CO_2$) being formed, since cross-linking/chain extension is less efficient.

Example 7

8.6 Mol % ESG Co-Polycarbonate: Cured at 325° C. for 5 Minutes

With approximately 300 mg 8.6 mol % ESG co-polycarbonate powder (dried for 1 hour at 100° C. in a vacuum oven) and a length of unsized carbon fiber tow (24K), a 250 μm-thick film with a diameter of 30 mm was prepared by compression molding using the following steps: (1) heat the mold for 5 minutes at 325° C. to melt the polymer and (2) heat for an additional 1 minute at 325° C. with 2 tons pressure to prepare a film.

From GPC analysis (PS data) of the matrix it can be concluded that limited amount of cross-linking/chain extension occurred since $M_w$ (53,669 g/mol) and PD (2.81) are similar to the original powder ($M_w$=49,585 g/mol; PD=2.80).

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed no residual PC on the fiber surface.

Apparently, at 325° C. more than 5 minutes are required to come to the results of Examples 4 and 5, where PC was detected with ATR-FTIR imaging of the fiber surface after DCM washing.

Example 8

8.6 Mol % ESG Co-Polycarbonate: Cured at 325° C. for 30 Minutes

With approximately 300 mg 8.6 mol % ESG co-polycarbonate powder (dried for 1 hour at 100° C. in a vacuum oven) and a length of unsized carbon fiber tow (24K), a 250 μm-thick film with a diameter of 30 mm was prepared by compression molding using the following steps: (1) heat the mold for 30 minutes at 325° C. to melt the polymer and (2) heat for an additional 1 minute at 325° C. with 2 tons pressure to prepare a film.

From GPC analysis (PS data) of the matrix it can be concluded that significant amount of cross-linking/chain extension occurred since $M_w$ increased to 70,967 g/mol (original powder $M_w$=49,585 g/mol). However, degradation also caused $M_n$ to decrease to 14,692 g/mol (original powder $M_n$=17,716 g/mol). These parallel events caused PD to increase from 2.80 (original powder) to 4.83.

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed residual PC on the fiber surface.

Since the film quality was poor (many bubbles, brittle, brown color and hard to remove from aluminum foil that is used to protect the film during compression molding), the following additional steps were needed to generate a film that could be studied with SEM: (1) remove fiber bundle from compression molded film that was prepared by the process described above and (2) combine these "coated" fibers with approximately 300 mg PC105 granulate (dried for 1 hour at 100° C. in a vacuum oven). To prepare a new 250 µm-thick film with a diameter of 30 mm by compression molding using the following steps: (1) heat the mold for 1 minute at 200° C. to melt the polymer and (2) heat for an additional 1 minute at 200° C. with 2 tons pressure to prepare a film.

Figure 5:
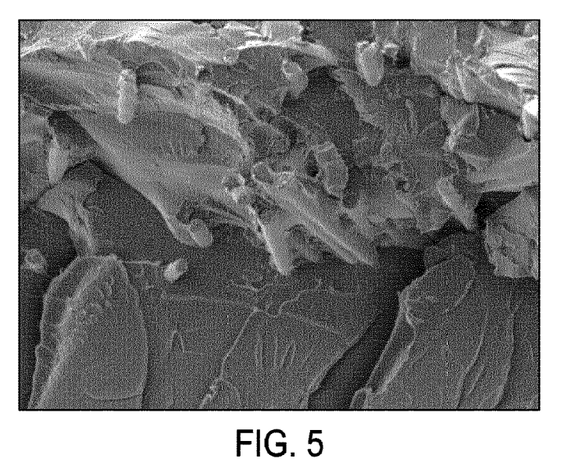
FIG. 5 shows an SEM image of composite material in some embodiments.
Figure 6:
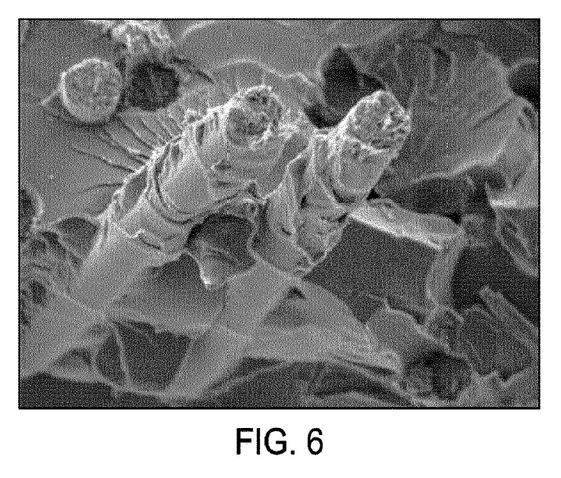
FIG. 6 is an enlarged image of the composite material of FIG. 5.

SEM analysis of the cross section, using cryo-fracture and sputter coating (5 nm PtPD) for sample preparation, showed short fibers with the matrix tight around the fibers and fibers of which the surface was completely covered with PC matrix. Both are a sign of good adhesion. FIG. 5 shows an SEM image of the resulting composite material. FIG. 6 is an enlarged image of the composite material of FIG. 5.

In Example 6 (1 minute at 325° C.) the high temperature of 325° C. allows improved fiber wetting and interfacial adhesion, while the long curing time of 30 minutes in this Example further improved the coupling between fiber and matrix. However, the film quality is poor since many bubbles (ethene and $CO_2$) are formed due to the cross-linking/chain extension reaction and degradation makes the film brittle and gives it a brown color. The latter makes these conditions less advantageous than Example 4, where less time (10 minutes) and a lower temperature (300° C.) also resulted in improved coupling between fiber and matrix, while the film quality is better (less bubbles and absence of discoloration and degradation).

Example 9

4.9 Mol % ESG Co-Polycarbonate: Cured at 200° C. for 1 Minute

With approximately 300 mg 4.9 mol % ESG co-polycarbonate powder (dried for 1 hour at 100° C. in a vacuum oven) and a length of unsized carbon fiber tow (24K), a 250 µm-thick film with a diameter of 30 mm was prepared by compression molding using the following steps: (1) heat the mold for 1 minute at 200° C. to melt the polymer and (2) heat for an additional 1 minute at 200° C. with 2 tons pressure to prepare a film.

From GPC analysis (PS data) of the matrix it can be concluded that limited amount of cross-linking/chain extension occurred since $M_w$ (51,853 g/mol) and PD (2.71) are similar to the original powder ($M_w$=48,677 g/mol; PD=2.76).

SEM analysis of the cross section, using cryo-fracture and sputter coating (5 nm PtPD) for sample preparation, showed long fibers and large gaps between the matrix and fibers, which both are typical for poor adhesion between fiber and matrix.

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed no residual PC on the fiber surface.

It can be concluded that there is poor coupling between unsized carbon fiber and non-cured 4.9 mol % ESG co-polycarbonate, similar to PC105 (comparative Example 1) and 8.6 mol % ESG co-polycarbonate (Example 1).

Example 10

4.9 Mol % ESG Co-Polycarbonate: Cured at 200° C. for 10 Minutes

With approximately 300 mg 4.9 mol % ESG co-polycarbonate powder (dried for 1 hour at 100° C. in a vacuum oven) and a length of unsized carbon fiber tow (24K), a 250 µm-thick film with a diameter of 30 mm was prepared by compression molding using the following steps: (1) heat the mold for 10 minutes at 200° C. to melt the polymer and (2) heat for an additional 1 minute at 200° C. with 2 tons pressure to prepare a film.

From GPC analysis (PS data) of the matrix it can be concluded that limited amount of cross-linking/chain extension occurred since $M_w$ (51,135 g/mol) and PD (2.69) are similar to the original powder ($M_w$=48,677 g/mol; PD=2.76).

SEM analysis of the cross section, using cryo-fracture and sputter coating (5 nm PtPD) for sample preparation, showed long fibers and large gaps between the matrix and fibers, which both are typical for poor adhesion between fiber and matrix.

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed no residual PC on the fiber surface.

Increasing the curing time from 1 minute (Example 9) to 10 minutes at 200° C. did not improve fiber wetting and interfacial adhesion.

Example 11

4.9 Mol % ESG Co-Polycarbonate: Cured at 250° C. for 10 Minutes

With approximately 300 mg 4.9 mol % ESG co-polycarbonate powder (dried for 1 hour at 100° C. in a vacuum oven) and a length of unsized carbon fiber tow (24K), a 250 µm-thick film with a diameter of 30 mm was prepared by compression molding using the following steps: (1) heat the mold for 10 minutes at 250° C. to melt the polymer and (2) heat for an additional 1 minute at 250° C. with 2 tons pressure to prepare a film.

From GPC analysis (PS data) of the matrix it can be concluded that a limited amount of cross-linking/chain extension occurred since $M_w$ (50,412 g/mol) and PD (2.68) are similar to the original powder ($M_w$=48,677 g/mol; PD=2.76).

SEM analysis of the cross section, using cryo-fracture and sputter coating (5 nm PtPD) for sample preparation, showed long and short fibers. Additionally, residual PC on the fiber surface is a sign of improved adhesion compared to Example 10.

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed residual PC on the fiber surface.

When cured for 10 minutes at 250° C. instead of 200° C. (Example 10) an improved coupling between matrix and fiber surface is observed in both SEM and ATR-FTIR analysis.

Example 12

4.9 Mol % ESG Co-Polycarbonate: Cured at 300° C. for 10 Minutes

With approximately 300 mg 4.9 mol % ESG co-polycarbonate powder (dried for 1 hour at 100° C. in a vacuum oven) and a length of unsized carbon fiber tow (24K), a 250 μm-thick film with a diameter of 30 mm was prepared by compression molding using the following steps: (1) heat the mold for 10 minutes at 300° C. to melt the polymer and (2) heat for an additional 1 minute at 300° C. with 2 tons pressure to prepare a film. From GPC analysis (PS data) of the matrix it can be concluded that limited amount of cross-linking/chain extension occurred since $M_w$ (51,307 g/mol) and PD (2.72) are similar to the original powder ($M_w$=48,677 g/mol; PD=2.76).

SEM analysis of the cross section, using cryo-fracture and sputter coating (5 nm PtPD) for sample preparation, showed short fibers and a matrix that is tight around the fiber, which are both a sign of good adhesion between fiber and matrix.

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed residual PC on the fiber surface.

Increasing the curing temperature from 250° C. (Example 11) to 300° C. further improved the coupling between matrix and fiber surface. This improved coupling can be assigned to the ester functionality, since only minor improvement of the interfacial adhesion and fiber wetting was observed for PC105 under the same conditions (comparative Example 3). Similar to 8.6 mol % ESG co-polycarbonate (Example 4) a curing time of 10 minutes at 300° C. seems to be a good combination for improving the coupling between fiber and matrix.

Example 13

4.9 Mol % ESG Co-Polycarbonate: Cured at 300° C. for 1 Minute

With approximately 300 mg 4.9 mol % ESG co-polycarbonate powder (dried for 1 hour at 100° C. in a vacuum oven) and a length of unsized carbon fiber tow (24K), a 250 μm-thick film with a diameter of 30 mm was prepared by compression molding using the following steps: (1) heat the mold for 1 minutes at 300° C. to melt the polymer and (2) heat for an additional 1 minute at 300° C. with 2 tons pressure to prepare a film.

From GPC analysis (PS data) of the matrix it can be concluded that limited amount of cross-linking/chain extension occurred since $M_w$ (49,934 g/mol) and PD (2.67) are similar to the original powder ($M_w$=48,677 g/mol; PD=2.76).

SEM analysis of the cross section, using cryo-fracture and sputter coating (5 nm PtPD) for sample preparation, showed long fibers and large gaps between the matrix and fibers, which both are typical for poor adhesion between fiber and matrix.

ATR-FTIR imaging of the fiber surface (plotting the IR-image of the C=O peak area between 1800 and 1710 cm$^{-1}$) after treating the compression molded film with 20 ml dichloromethane (DCM) overnight, followed by washing (2×20 ml) and vacuum drying (80° C. overnight) of the remaining fibers, showed no residual PC on the fiber surface.

Although a higher temperature was used for compression molding compared to comparative Example 9, the reduced viscosity of the resin did not improve fiber wetting and interfacial adhesion.

Example 14

Thermal Desorption GC-TOFMS of 4.9 Mole % ESG Co-Polycarbonate

Volatiles were analyzed with GC-TOFMS after thermal desorption of approximately 5 mg 4.9 mole % ESG co-polycarbonate powder (dried for 2 hours at 120° C. in a vacuum oven) at 300° C. for both 10 minutes and 30 minutes. The total ion chromatogram (TIC) was analyzed and relevant peaks were quantified, shown in Table 1 in comparative Example 5.

Example 15

Single Fiber Pull Out 4.9 Mole % ESG Co-Polycarbonate: Cured at 300° C. for 30 Seconds Single fiber model composites were produced by embedding 150 μm of a single unsized carbon fiber into 4.9 mole % ESG co-polycarbonate (dried for 2 hours at 120° C.) at 300° C. under argon atmosphere using the following sequence. First the polycarbonate was heated to 300° C. at 7° C./min and held at 300° C. for 30 seconds. 150 μm of a fiber was embedded and the mixture was held at 300° C. for 30 seconds. The mixture was then cooled to room temperature in 30 minutes The melting process was performed at a lower speed than for Lexan HF-1110 in comparative example 6 (7° C./min and 15° C./min, respectively) to limit the formation of bubbles.

Table 2 in comparative example 6 shows the work needed to debond and pull out ($W_{total}$) a single fiber from the matrix, based on 15-20 measurements. Compared to single fiber pull out testing with Lexan HF-1110, twice as much work is needed to debond and pull out the fiber from 4.9% ESG PC.

Example 16

Single Fiber Pull Out 4.9 Mole % ESG Co-Polycarbonate: Cured at 300° C. for 10 Minutes Single fiber model composites were produced by embedding 150 μm of a single unsized carbon fiber into 4.9 mole % ESG co-polycarbonate (dried for 2 hours at 120° C.) at 300° C. under argon atmosphere using the following sequence. First the polycarbonate was heated to 300° C. at 7° C./min and held at 300° C. for 30 seconds. 150 μm of a fiber was embedded and the mixture was held at 300° C. for 10 minutes. The mixture was then cooled to room temperature in 30 minutes Similar to example 15 a low heating speed of 7° C./min was used for melting the polymer to limit the formation of bubbles. However, when keeping the polymer at 300° C. for 10 minutes after fiber embedment (versus 30 seconds in example 15) bubbles are produced, which indicates reaction of the ester side group.

Table 2 in comparative Example 6 shows the work needed to debond and pullout ($W_{total}$) the single fiber. The values for this example are based on only 9 measurements since the majority of the fibers broke during pull-out testing. In addition the work needed to debond and pull-out the fiber from the matrix (average of 9 fibers) is twice as high as in example 15, where the fiber was embedded into 4.9 mole % ESG co-polycarbonate for only 30 seconds.

As evidenced by the Examples, the overall properties of the formed material is a function of many factors. Those factors include the curing temperature, hold time, and mol % of the ESG material. For Examples including 8.6 mol % ESG co-polycarbonate, it was found that the best product resulted from curing the product at 300° C. with a hold time of 10 minutes. It was found that the curing temperature typically needed to be about 300° C. to show improved fiber wetting and interfacial adhesion. Additionally, it was found that a hold time under 10 minutes typically did not result in a product with good interfacial adhesion.

Typically, curing at a temperature above 300° C. can improve the fiber wetting and interfacial adhesion. But if the hold time is at or above 10 minutes, then bubbles, discoloration, and degradation of the product was observed. Additionally, it was found that even at higher temperatures a hold time of less than 10 minutes did not result in as good of adhesion as those Examples with a higher hold time. Similarly products formed using a curing temperature of less than 300° C., even when coupled with longer hold times, did not produce products showing the degree of adhesion as those cured at 300° C. for about 10 minutes.

Products formed that included 4.9 mol % ESG copolycarbonate showed similar results, when subjected to various curing temperatures and hold times.

While products formed using 8.6 mol % or 4.9 mol % ESG material showed variable adhesion between the co-polycarbonate component and the carbon fiber, both products showed better adhesion than those of the comparative Examples. The comparative Examples, which included 0 mol % ESG consistently showed large gaps between the polycarbonate component and the carbon fiber. This was indicative of poor adhesion.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following embodiments are provided, the numbering of which is not to be construed as designating levels of importance:

Embodiment 1 provides a composition comprising:
a polycarbonate component comprising a repeating unit comprising an electrophilic side chain;
a carbon fiber component comprising an activated surface wherein the activated surface comprises a nucleophilic group; and
an interface between the polycarbonate component and the carbon fiber component.

Embodiment 2 provides the composition of Embodiment 1, wherein the activated surface comprises a nucleophilic group.

Embodiment 3 provides the composition of any one of Embodiments 1 or 2, wherein the nucleophilic group is selected from the group consisting of, a hydroxy group, a carboxyl group, an amino group, and a combination thereof.

Embodiment 4 provides the composition of any one of Embodiments 1-3, wherein the carbon fiber component comprises one or more carbon fibers.

Embodiment 5 provides the composition of any one of Embodiments 2-4, wherein the activated surface comprises about 0.05 atomic concentration % to about 20 atomic concentration % nucleophilic groups.

Embodiment 6 provides the composition of any one of Embodiments 1-5, wherein the polycarbonate component comprises a copolymer.

Embodiment 7 provides the composition of any one of Embodiments 1-6, wherein the polycarbonate component further comprises a polycarbonate copolymer comprising a repeating unit derived from a bisphenol derivative and the repeating units are each independently in random, block, or alternating configuration.

Embodiment 8 provides the composition of Embodiment 7, wherein the electrophilic side chain comprises a carbonyl group.

Embodiment 9 provides the composition of Embodiment 8, wherein the carbonyl group is selected from the group consisting of, an ester, a carboxylic acid, and combinations thereof.

Embodiment 10 provides the composition of any one of Embodiments 7-9, wherein the repeating unit comprising the electrophilic side chain has the structure:

wherein, $R^1$ is an aryl group comprising the electrophilic side chain.

Embodiment 11 provides the composition of Embodiment 10, wherein the aryl group comprises a phenyl group.

Embodiment 12 provides the composition of Embodiment 11, wherein $R^1$ is meta, ortho, or para substituted in a backbone of the copolymer.

Embodiment 13 provides the composition of any one of Embodiments 10-12, wherein $R^1$ has the structure:

wherein each $R^2$ is independently chosen from:

and —H,
wherein at least one $R^2$ is an ester, and
wherein $R^3$ is $(C_1-C_{10})$ alkyl.

Embodiment 14 provides the composition of Embodiment 13, wherein the repeating unit comprising the electrophilic side chain has the structure:

Embodiment 15 provides the composition of Embodiment 14, wherein $R^3$ is $(C_1-C_4)$ alkyl.

Embodiment 16 provides the composition of Embodiment 15, wherein $R^3$ is selected from the group consisting of, methyl, ethyl, propyl, isopropyl, isobutyl, n-butyl, sec-butyl, tert-butyl and combinations thereof.

Embodiment 17 provides the composition of Embodiment 16, wherein the repeating unit comprising the electrophilic side chain has the structure:

Embodiment 18 provides the composition of any one of Embodiments 16 or 17, wherein the repeating comprises the structure:

Embodiment 19 provides the composition of any one of Embodiments 7-18, wherein the repeating units of the polycarbonate copolymer are in random configuration Embodiment 20 provides the composition of any one of Embodiments 7-19, wherein the bisphenol derived repeating unit is about 50 mol % to about 99 mol % of the polycarbonate copolymer.

Embodiment 21 provides the composition of Embodiment 20, wherein the bisphenol derived repeating unit is about 70 mol % to about 99 mol % of the polycarbonate copolymer.

Embodiment 22 provides the composition of any one of Embodiments 7-21, wherein the electrophilic side group containing repeating unit is about 0.2 mol % to about 50 mol % of the polycarbonate copolymer.

Embodiment 23 provides the composition of Embodiment 22, wherein the electrophilic side group containing repeating unit is about 0.2 mol % to about 20 mol % of the polycarbonate copolymer.

Embodiment 24 provides the composition of Embodiment 23, wherein the electrophilic side group containing repeating unit is about 0.2 mol % to about 9 mol % of the polycarbonate copolymer.

Embodiment 25 provides the composition of any one of Embodiments 7-24, wherein the bisphenol derived repeating unit is selected from the group consisting of 1,1-bis(4-hydroxyphenyl)methane, 1,1-bis(4-hydroxyphenyl)ethane, 2,2-bis(4-hydroxyphenyl)butane, 2,2-bis(4-hydroxyphenyl) octane, 1,1-bis(4-hydroxyphenyl)propane, 1,1-bis(4-hydroxyphenyl)-n-butane, 2,2-bis(4-hydroxy-1-methylphenyl) propane, 4,4'-dihydroxybiphenyl, bis(4-hydroxyphenyl) methane, bis(4-hydroxyphenyl)diphenylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 1,1-bis (hydroxyphenyl)cyclopentane, 1,1-bis(4-hydroxyphenyl) cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl) adamantine, (alpha,alpha'-bis(4-hydroxyphenyl)toluene, bis (4-hydroxyphenyl)acetonitrile, 1,1-dichloro-2,2-bis(4-hydroxyphenyl)ethylene, 1,1-dibromo-2,2-bis(4-hydroxyphenyl)ethylene, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2-phenyl-3,3-bis-(4-hydroxyphenyl) phthalimidine (PPPBP), 2,2-bis(4-hydroxy-3-bromophenyl)propane, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)

propane, 2,2-bis(3-methoxy-4-hydroxyphenyl)propane, 2,2-bis(4-hydroxyphenyl)hexafluoropropane, 1,1-dichloro-2,2-bis(5-phenoxy-4-hydroxyphenyl)ethylene, bis-(4-hydroxyphenyl)diphenylmethane), bis(4-hydroxydiphenyl)methane, 2,2-bis(4-hydroxy-3-isopropyl-phenyl)propane, 5,5'-(1-methylethyliden)-bis[1,1'-(bisphenyl)-2-ol]propane, 1,1-bis(4-hydroyphenyl)-3,3,5-trimethyl-cyclohexane, 1,1-bis(4-hydroxyphenyl)-cyclohexane, 2-phenyl-3,3'-bis(4-hydroxy phenyl) phthalimidine, and combinations thereof.

Embodiment 26 provides the composition of Embodiment 25, wherein the repeating unit comprising the electrophilic side chain is an end group formed from a monofunctional hydroxyl containing monomer.

Embodiment 27 provides the composition of any one of Embodiments 25 or 26, wherein the bisphenol derived repeating unit is bisphenol A (2,2-bis(4-hydroxyphenyl)propane).

Embodiment 28 provides the composition of any one of Embodiments 7-27, wherein the electrophilic side group containing repeating unit can be formed from ethyl 3,5 dihydroxybenzoate.

Embodiment 29 provides the composition of any one of Embodiments 7-28, wherein the polycarbonate copolymer has the structure:

Embodiment 30 provides the composition of any one of Embodiments 7-29, wherein about 0 mol % to about 100 mol % of the repeating unit comprising the electrophilic side chain is crosslinked.

Embodiment 31 provides the composition of any one of Embodiments 7-30, wherein about 5% to about 95% of the repeating unit comprising the electrophilic side chain is crosslinked.

Embodiment 32 provides the composition of any one of Embodiments 7-31, wherein about 30% to about 95% of the repeating unit comprising the electrophilic side chain is crosslinked.

Embodiment 33 provides the composition of any one of Embodiments 7-32, wherein about 60% to about 95% of the repeating unit comprising the electrophilic side chain is crosslinked.

Embodiment 34 provides the composition of any one of Embodiments 7-33, wherein about 70% to about 95% of the repeating unit comprising the electrophilic side chain is crosslinked.

Embodiment 35 provides the composition of any one of Embodiments 30-34, wherein the crosslink is an intermolecular crosslink.

Embodiment 36 provides the composition of any one of Embodiments 30-35, wherein the crosslink is an intramolecular crosslink.

Embodiment 37 provides the composition of any one of Embodiments 1-36, wherein the carbon fiber component is about 1 wt % to about 70 wt % of the composition.

Embodiment 38 provides the composition of any one of Embodiments 1-37, wherein the carbon fiber component is about 15 wt % to about 60 wt % of the composition.

Embodiment 39 provides the composition of any one of Embodiments 1-38, wherein the carbon fiber component and the polycarbonate component are in direct contact at the interface.

Embodiment 40 provides the composition of any one of Embodiments 7-39, and further comprising:
a second polycarbonate component that is free of the electrophilic side chain.

Embodiment 41 provides the composition of any one of Embodiments 39 or 40, and further comprising:
an interface between the second polycarbonate component and the polycarbonate component.

Embodiment 42 provides the composition of any one of Embodiments 1-41, further comprising a phosphorous-containing flame retardant additive, a halogen-containing flame retardant, a metal-hydroxide-containing flame retardant, or mixtures thereof.

Embodiment 43 provides the composition of Embodiment 42, wherein the flame retardant additive is a phosphorous-containing flame retardant comprising at least one of: a organophosphorus compound, a triraryl phosphate, a phosphite, a phosphonate, a polyphosphate, a polyphosphonate, and a phosphinate.

Embodiment 44 provides a composite material formed from the composition of any one of Embodiments 1-43, wherein the interface comprises a covalent bond formed between the polycarbonate component and the activated surface of the carbon fiber component.

Embodiment 45 provides the composite material of Embodiment 44, wherein the covalent bond can be formed between the activated surface of the carbon fiber component and an electrophilic side chain of the polycarbonate component.

Embodiment 46 provides the composite material of Embodiment 45, wherein about 1% to about 100% of the electrophilic side chain is covalently bonded to the activated surface of the carbon fiber component.

Embodiment 47 provides the composite material of any one of Embodiments 45 or 46, wherein about 50% to about 100% of the electrophilic side chain is covalently bonded to the activated surface of the carbon fiber component.

Embodiment 48 provides the composite material of any one of Embodiments 45-47, wherein about 75% to about 100% of the electrophilic side chain is covalently bonded to the activated surface of the carbon fiber component.

Embodiment 49 provides the composite material of any one of Embodiments 44-48, wherein the material is a cured composite material.

Embodiment 50 provides a composite material formed from the composition of any one of Embodiments 1-49, wherein the interface comprises an ionic bond formed between the polycarbonate component and the carbon fiber component.

Embodiment 51 provides a composite material formed from the composition of any one of Embodiments 1-50, wherein the interface comprises a hydrogen bond formed between the polycarbonate component and the carbon fiber component.

Embodiment 52 provides the composite material of Embodiment 51, wherein the hydrogen bond can be formed between electrophilic side chains of the polycarbonate component and the activated surface of the carbon fiber component.

Embodiment 53 provides a composite material formed from the composition of any one of Embodiments 1-52, wherein the interface comprises van der Waals forces between the polycarbonate component and the carbon fiber component.

Embodiment 54 provides the composite material of Embodiment 53, wherein the van der Waals forces are between the electrophilic side chains of the polycarbonate component and the activated surface of the carbon fiber component.

Embodiment 55 provides a composite material formed from the composition of any one of Embodiments 1-54, wherein the interface comprises a mechanical connection between the polycarbonate component and the carbon fiber component.

Embodiment 56 provides the composite material of Embodiment 55, wherein the polycarbonate component is at least partially wrapped around the carbon fiber component.

Embodiment 57 provides the composite material of any one of Embodiments 30-56, wherein the composite material is more flame retardant than a corresponding composite material that has less intermolecular or intramolecular cross-linking than the composite material.

Embodiment 58 provides a method of forming a composite material comprising:
  contacting the composition of Embodiment 1 with a mold;
  heating the mold; and
  applying pressure to the mold;
wherein the composite material can be formed.

Embodiment 59 provides the method of Embodiment 58, wherein heating the mold comprises curing the composition of Embodiment 1.

Embodiment 60 provides the method of any one of Embodiments 58 or 59, wherein the mold is heated to a temperature above a melting temperature of the polycarbonate component.

Embodiment 61 provides the method of any one of Embodiments 58-60, wherein the mold is heated to a temperature ranging from about 100° C. to about 350° C.

Embodiment 62 provides the method of any one of Embodiments 58-61, wherein the mold is heated to temperature ranging from about 200° C. to about 350° C.

Embodiment 63 provides the method of any one of Embodiments 58-62, wherein the mold is heated from about 1 minute to about 60 minutes.

Embodiment 64 provides the method of any one of Embodiments 58-63, wherein the mold is heated from about 1 minute to about 30 minutes.

Embodiment 65 provides the method of any one of Embodiments 58-64, wherein the mold is heated from about 1 minutes to about 15 minutes.

Embodiment 66 provides the method of any one of Embodiments 58-65 and further comprising applying pressure to the composition.

Embodiment 67 provides the method of Embodiment 66, wherein the pressure ranges from about 0.5 ton to about 4 tons.

Embodiment 68 provides the method of any one of Embodiments 66 or 67, wherein the pressure ranges from about 1 ton to about 2 tons.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "alkyl" as used herein refers to substituted and unsubstituted straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethyl-propyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "cycloalkyl" as used herein refers to substituted and unsubstituted cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. In some embodiments, cycloalkyl groups can have 3 to 6 carbon atoms (C3-C6). Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like.

The term "aryl" as used herein refers to substituted and unsubstituted cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The terms "halo," "halogen," or "halide" group, as used herein, by themselves or as part of another substituent, mean, unless otherwise stated, a fluorine, chlorine, bromine, or iodine atom.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "arylene" as used herein refers to divalent groups that are derived by removing two hydrogen atoms from an arene, which is a cyclic aromatic hydrocarbon, having from 6 to 18 carbon atoms, 10 to 18 carbon atoms, 12 to 18 carbon atoms, 6 to about 10 carbon atoms or 6 to 8 carbon atoms. Examples of ($C_6$-$C_{18}$)arylene groups include:

wherein the wavy lines represent the points of attachment to, e.g., —($C_1$-$C_6$)-alkylene group.

The term "arylalkyl" as used herein refers to alkyl groups as defined herein in which a hydrogen or carbon bond of an alkyl group is replaced with a bond to an aryl group as defined herein.

The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members.

The term "substituted" as used herein refers to a group that can be or is substituted onto a molecule. Examples of substituents include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl. The term "acyl" as used herein refers to a group containing a carbonyl moiety wherein the group is bonded via the carbonyl carbon atom.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl.

The term "heterocyclyl" as used herein refers to aromatic and non-aromatic ring compounds containing three or more ring members, of which one or more is a heteroatom such as, but not limited to, N, O, and S.

The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure.

The term "heteroarylalkyl" as used herein refers to alkyl groups as defined herein in which a hydrogen or carbon bond of an alkyl group is replaced with a bond to a heteroaryl group as defined herein.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatog- raphy, spectroscopic end group analysis, and osmometry. If unspecified, molecular weights of polymers given herein are number-average molecular weights.

The term "weight-average molecular weight" ($M_w$), which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "cure" as used herein refers to exposing to radiation in any form, heating, or allowing to undergo a physical or chemical reaction that results in hardening or an increase in viscosity. For example, a flowable thermoplastic material can be cured by cooling it such that the material hardens. As another example, a flowable thermoset material can be cured by any suitable means, including heating or otherwise exposing to irradiation such that the material hardens.

The invention claimed is:

1. A composition comprising:
   a polycarbonate component comprising a repeating unit comprising an electrophilic side chain, the repeating unit having the structure wherein $R^1$ has the structure:

wherein each $R^2$ is independently chosen from:

and —H,
   wherein at least one $R^2$ is an ester, and
   wherein $R^3$ is ($C_1$-$C_{16}$) alkyl;
   a carbon fiber component comprising an activated surface wherein the activated surface comprises a nucleophilic group; and
   an interface between the polycarbonate component and the carbon fiber component.

2. The composition of claim 1, wherein the nucleophilic group is selected from the group consisting of a hydroxy group, a carboxyl group, an amino group, and a combination thereof.

3. The composition of claim 1, wherein the carbon fiber component comprises one or more carbon fibers.

4. The composition of claim 1, wherein the polycarbonate component further comprises a polycarbonate copolymer comprising a repeating unit derived from a bisphenol derivative, wherein the polycarbonate copolymer has a random, block, or alternating configuration.

5. The composition of claim 4, wherein $R^1$ is meta, ortho, or para substituted in a backbone of the polycarbonate copolymer.

6. The composition of claim 1, wherein the repeating unit comprising the electrophilic side chain has the structure:

wherein $R^3$ is ($C_1$-$C_4$) alkyl.

7. The composition of claim 6, wherein $R^3$ is selected from the group consisting of methyl, ethyl, propyl, isopropyl, isobutyl, n-butyl, sec-butyl, tert-butyl and combinations thereof.

8. The composition of claim 4, wherein the polycarbonate copolymer has a random configuration.

9. The composition of claim 4, wherein the polycarbonate copolymer has the structure:

10. A method of forming a composite material comprising:
    contacting the composition of claim 1 with a mold;
    heating the mold; and
    applying pressure to the mold;
    wherein the composite material is formed.

11. The method of claim 10, wherein heating the mold comprises curing the composition.

12. The method of claim 11, wherein the mold is heated to a temperature ranging from about 100° C. to about 350° C.

13. The method of claim 11, wherein the mold is heated to temperature ranging from about 200° C. to about 350° C.

* * * * *